United States Patent [19]
Bee et al.

[11] Patent Number: 5,472,726
[45] Date of Patent: Dec. 5, 1995

[54] FROZEN CONFECTIONS

[75] Inventors: Rodney D. Bee, St. Neots; David Needham, Rushden; Keith Smallwood, Wellingborough, all of United Kingdom

[73] Assignee: Good Humor Corporation, Green Bay, Wis.

[21] Appl. No.: 160,536

[22] Filed: Dec. 1, 1993

[30]    Foreign Application Priority Data

Dec. 2, 1992 [EP]  European Pat. Off. .............. 92311065

[51] Int. Cl.⁶ ...................................................... A23G 9/00
[52] U.S. Cl. .......................................... 426/565; 426/804
[58] Field of Search ................................... 426/564, 565, 426/566, 567, 572

[56]                References Cited
              U.S. PATENT DOCUMENTS 4,012,533  3/1977  Jonas ........................................ 426/565
4,298,625  11/1981 Cillario .................................... 426/572
4,450,182  5/1984  Stahl et al. .............................. 426/565
4,542,035  9/1985  Huang et al. ........................... 426/565
4,637,937  1/1987  Terada et al. ........................... 426/570
4,818,554  4/1989  Giddey et al. .......................... 426/564
4,957,656  9/1990  Cerny et al. ............................. 252/311

FOREIGN PATENT DOCUMENTS 0521543    1/1983  European Pat. Off. .
0274348    7/1988  European Pat. Off. .
WO92/05806 4/1992  WIPO .

OTHER PUBLICATIONS

PCT International Preliminary Examination Report.
International Search Report.

*Primary Examiner*—Jeanette Hunter
*Attorney, Agent, or Firm*—James J. Farrell

[57]              ABSTRACT

Stable gas cells having $d_{3,2}$ average particle size below 20 µm are used in ice confections to provide creaminess, whiteness and flavor enhancement.

4 Claims, 6 Drawing Sheets

FROZEN CONFECTIONS

FIELD OF THE INVENTION

This invention relates to frozen confections, in particular ice cream, which may be aerated. The optional aeration is usually defined by the overrun; there is no restriction on the overrun in the product of the invention but generally it is in the range of 50% to 200%. The invention is usable also with ice milks, frozen yoghurts and frozen custards and creams, as examples.

BACKGROUND TO THE INVENTION

The compositions of frozen confections have been well characterised in literature and the products are widely sold. The products are required to have desirable product properties, for example appropriate texture, appearance and flavour.

Literature

Ice confections have been described generally in ice cream by W. S. Arbuckle published by AVI Publishing Inc in 1986 (4th Edition) and previous editions and in J Soc Dairy Technology 1990, 43 (1), pages 17 to 20. Unpublished European patent application 92201564.9 (Unilever) describes the preparation of stable gas cells for use in foodstuffs.

GENERAL DESCRIPTION OF THE INVENTION

A problem encountered with many products containing gas cells is the stability with time: this is because a gas cell dispersion comprising large cells is vulnerable to creaming separation of the dispersion into discrete layers of different gas phase volume, the larger cells in the high gas phase volume layer will coalesce through film rupture, while the smaller gas cells, say under 100 µm, are unstable with time, due to disproportionation in favour of larger cells and this is in particular true if the gas cells become finer.

EPA 92201564.9 describes gas cells dispersed in a continuous liquid medium in a stable condition, ie having a stability in excess of two weeks, the gas cells having a measured $d_{32}$ average diameter of less than 20 µm and the gas phase volume of which the gas cells may appear in different embodiments in a characteristic appearance at the boundary surface, ie the surface separating the gas of each cell and the rest of the product preferably is structured and comprising a multitude of adjacent domes. Specific stability is obtained if the great majority of the domes has hexagonal and some pentagonal outlines. Usually some irregularities, eg higher polygons are present amongst the domes structures. These polygons may be of very irregular shape.

Gas cells of a good stability with respect to creaming and disproportionation are obtained when the cells have diameters in the range from 0.1 to 20 µm and more preferably from 0.5 to 3 µm. Diameter throughout this description and claims refers to a measured $d_{32}$ (volume surface) average diameter. The expression "liquid medium" in this description and claims comprises any medium showing molecule mobility, ie including gels and viscous liquids.

A suitable method of preparing a multitude of gas cells in a liquid medium is also provided by EPA 92201564.9 and comprises whipping a liquid medium with a gas such that gas cells of the required dimension are formed while having a surface active agent contained in that liquid medium for stabilising the gas cells. For obtaining the gas cells of the required dimensions sufficient shear should be exerted on the larger gas cells that initially are formed. Factors influencing this shear are the type of mixer or beater or whisk, the viscosity of the liquid medium and the temperature thereof.

In practice a high shear, eg a Kenwood Chef mixer, a colloid mill, an Oakes mixer, a cavity transfer mixer or a Silverson will be used. By increasing the viscosity and/or lowering the temperature of the liquid medium the size reducing effect of the mixer on the gas cells is increased. If a Kenwood Chef mixer is used at room temperature a suitable dynamic viscosity of the liquid medium is preferably from 0.1 Pas to 20 Pas although the range of from 0.2 to 0.4 Pas is preferred.

Having obtained the gas cells in the form of a thick creamy foam, this foam is then aged. Stable gas cells may then be separated from part of the liquid medium used for preparing the cells. Separation may be done by centrifuging or using a dialysis membrane after modifying the liquid phase of the gas cell suspension such as by dilution with a miscible fluid.

It has now been found that stable gas cells can advantageously be used in ice confections.

The use of the gas cells in ice confections of the invention provides improved creaminess in texture, a whiter product and, dependent on components, enhanced flavour. Having similar particle size to an oil or fat emulsion, suspensions of gas cells prepared as described can be used to replace, or improve on, some of the attributes normally contributed by the oil/fat.

Accordingly, the invention relates to an ice confection comprising gas cells having a stability in excess of two weeks and a substantial number percentage of which have a particle size of less than 20 µm.

The invention is founded on the preparation of a large number of very stable gas cells of very small size. When such cells are present in bulk they will form about $10^8$ to about $10^{10}$ per ml. On incorporation in an ice confection they are preferably distributed throughout the mass in the form of discrete cells so as to provide the benefits associated with their presence. However it must be expected that the cells will form flocculates in the product. The stable gas cells, whether present in discrete form or as flocculates, are distinguished from any overrun aeration present. The latter is not in the form of stable cells, but contributes most of the volume.

Usually the gas cell number concentration in the product will be above about $10^6$ per ml, preferably above $10^7$ per ml, with the number and size selected to provide the desired benefit.

The particle size of the gas cells is less than 20 µm, more preferred 0.1 to 10 µm, most preferred from 1 to 6 µm.

Gas cells for use in products of the invention have a stability in excess of 2 weeks. With this is meant that upon storage for 2 weeks at 4° C. more than 90% by number of the gas cells in the product still remain intact. Especially preferred are products, wherein the stability of the gas cells is more than 4 weeks, most preferred more than 8 weeks.

The gas cells may be prepared from an edible surface active material suitable for the making of gas cells with structured surfaces, for example mono-, di- or tri- long chain fatty acid esters of sucrose or distearyol or dipalmitoyl phosphatidylcholine or mixtures thereof.

In general the sufactants used will have head groups which do not carry a substantial charge compared to that of an ionised anionic or cationic surfactant and whose head group also occupies a similar surface area to that of the tail group. The tail group is capable of crystallising at the storage temperature of the composition. Preferably, the tail group of the surfactant is saturated and has a carbon chain of at least 14, preferably from 16 to 22 carbon atoms. Suitable surfactants are nonionic or virtually so in character.

If desired any suitable thickener may be present in the system while forming the stable gas cells. Suitable thickener materials are for example sugars, (hydroxy-alkyl) celluloses, hydrolysed starches etc.

For preparing ice confections containing the gas cells in accordance to the invention, it is preferred to prepare the gas cells in bulk separately and add these as an ingredient to the product during or after its preparation, or it is possible to prepare the gas cells in the presence of one or more other ingredients of the composition.

Preferably the gas cells are pre-prepared. A suitable method involves the preparation of an aqueous solution of the desired viscosity (for example by using a thickener material at a suitable level) and containing 0.1 to 20 wt % of edible surfactant(s). In this context it is believed to be within the ability of the skilled person to select those thickeners which will be capable of contributing to the desired viscosity of the aqueous solution. The selection of the surfactant is critical to the subsequent stability of the gas cells. It is restricted to those providing the surface characteristics typified by the examples given above. The aqueous solution is then whipped, preferably at high shear, until a system is formed wherein the average particle size of the gas cells is as desired. By taking the appropriate surfactant phase with water or other solutes at low levels, gas cells according to the invention may be manufactured without the use of a separate component to contribute to viscosity.

SPECIFIC DESCRIPTION OF THE INVENTION

Illustration of the Gas Cells

Accompanying

EXAMPLES

Examples 1 to 4 illustrate the preparation of gas cells for subsequent incorporation into ice confections of the invention.

Example 1

An aqueous solution was prepared containing 70% by wt of maltodextrin 63DE and 2% by wt of a commercial sucrose mono stearate ester. Using a Kenwood chef mixer this solution was whipped with air for 1 hour at speed 5. A thick creamy foam resulted.

This foam showed an air phase volume of 0.6 and the great majority of the gas cells has a diameter of the order of 2 µm and below. On standing for 40 days little visible change had occurred.

Figure 1:
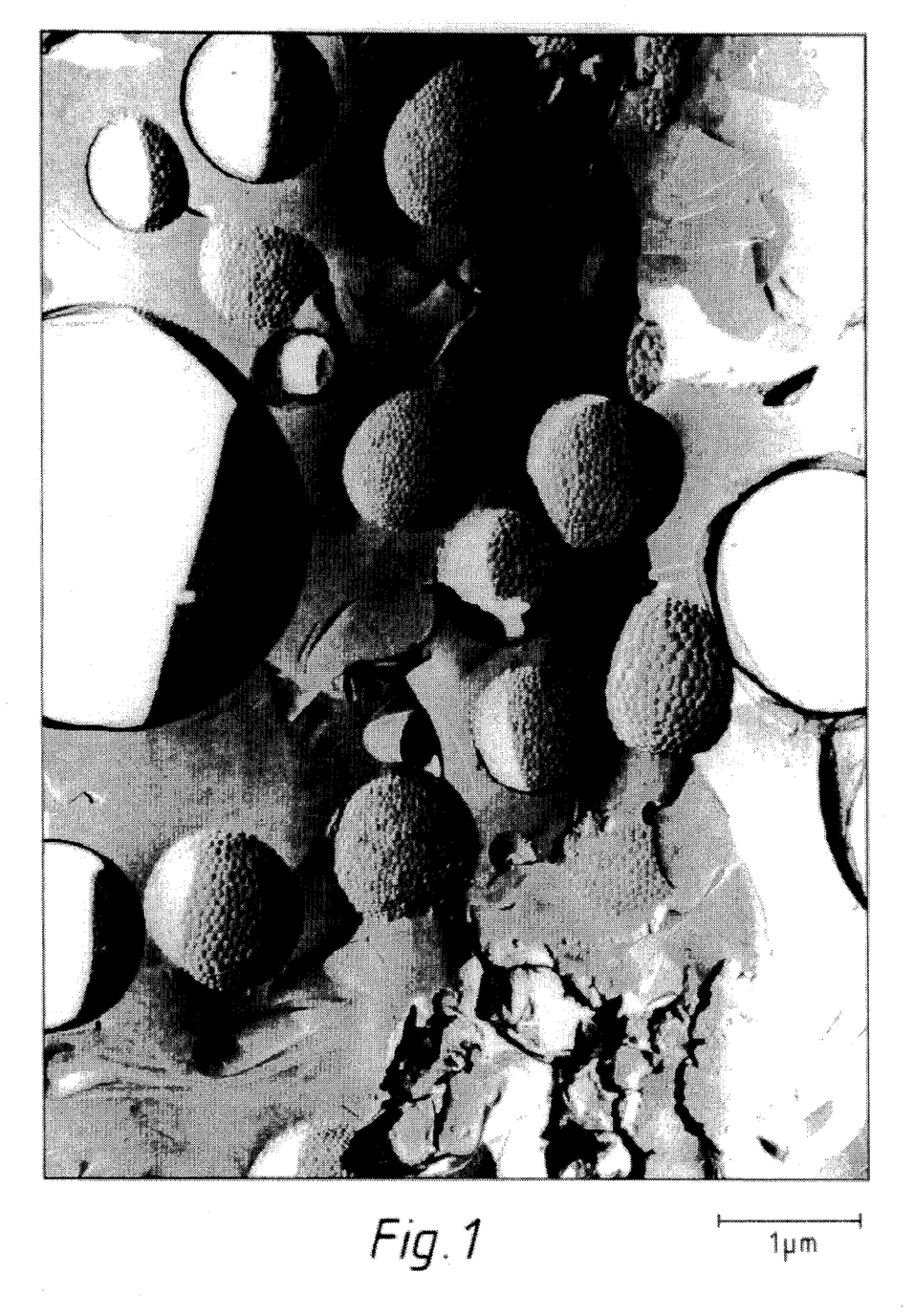
FIGS. 1 to 6 show some electron micrographs of domed and differently structured gas cells according to the invention, each made at a different magnification factor.
Figure 2:
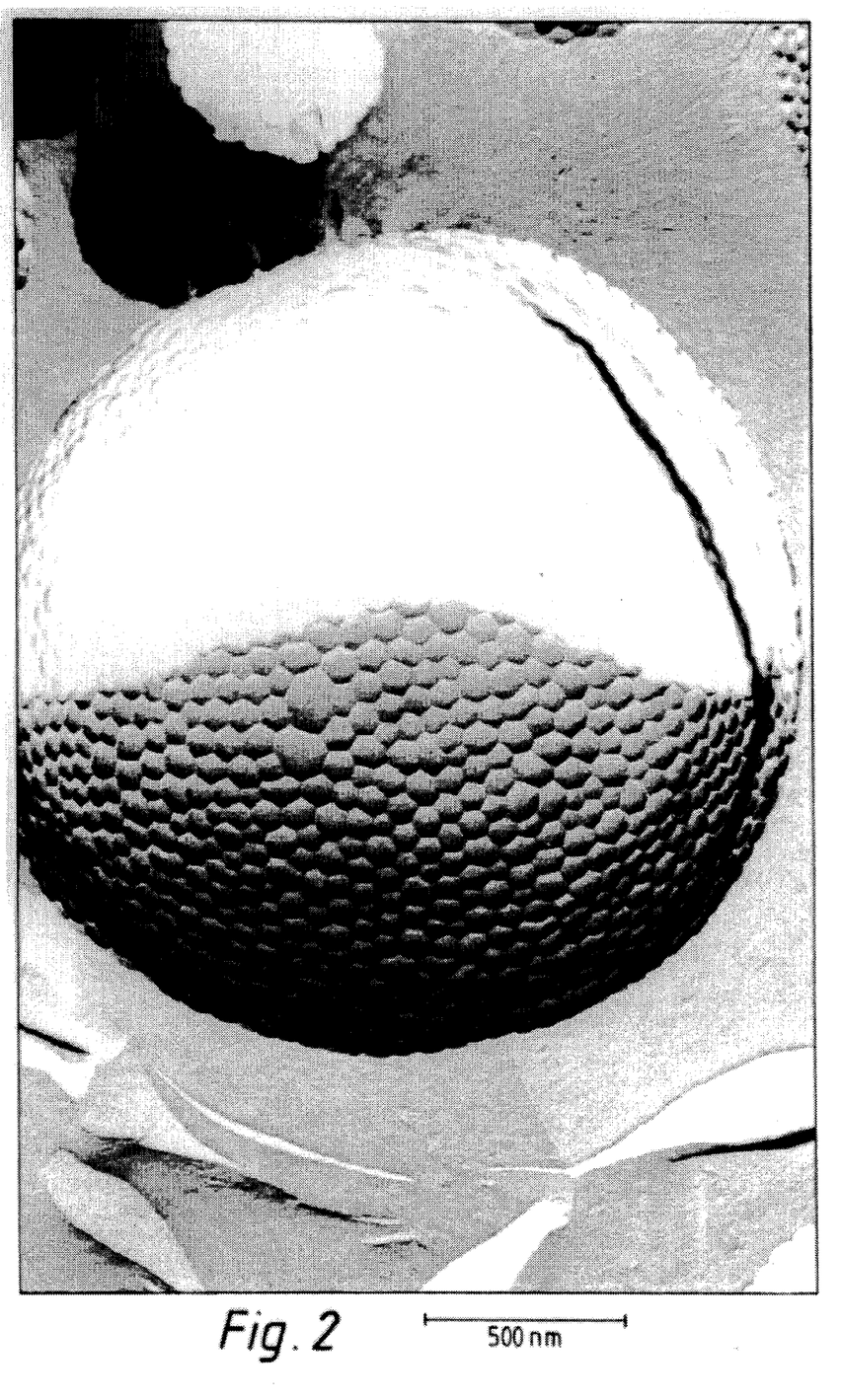
Figure 3:
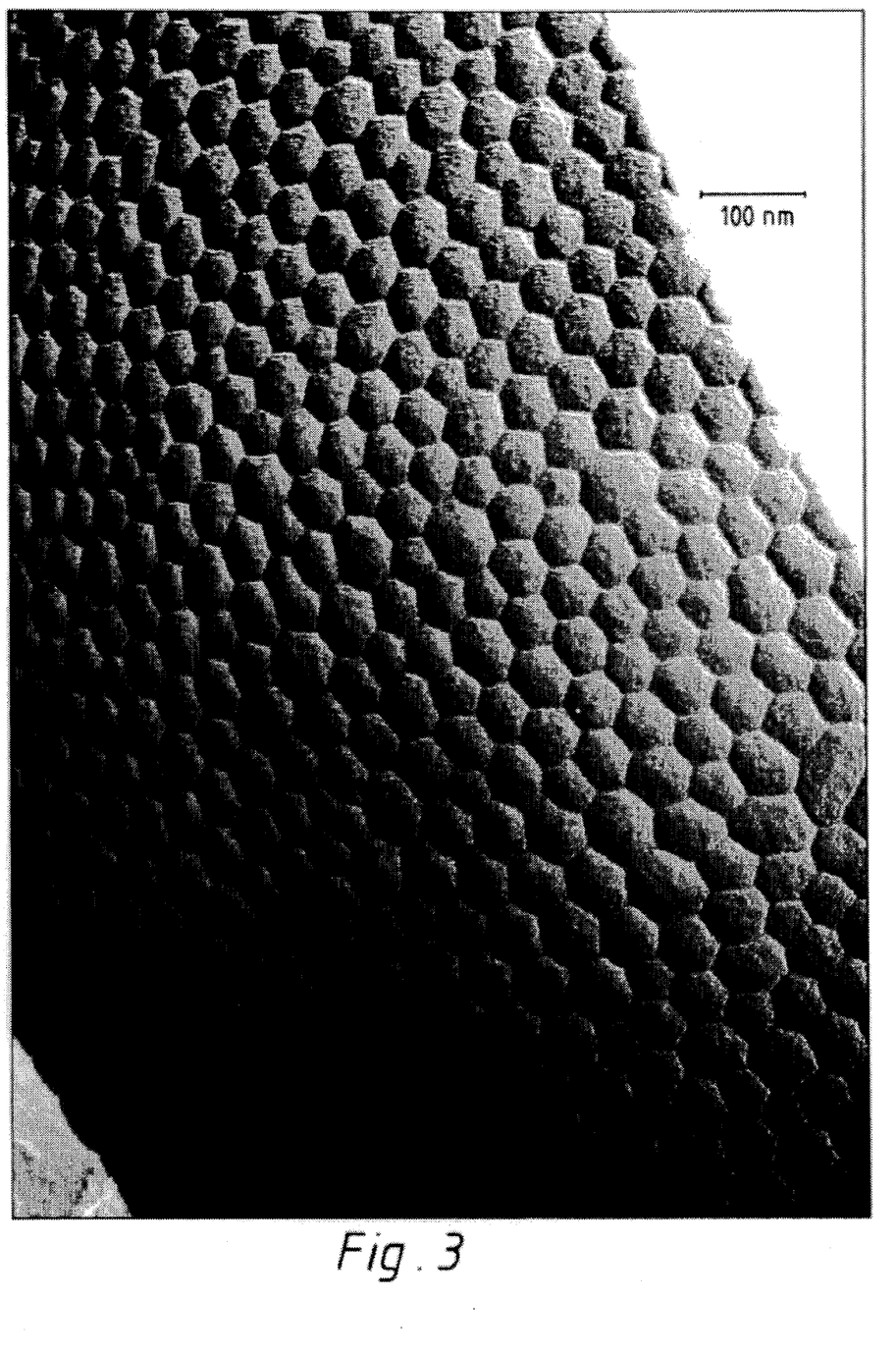

Electron microscopy photographs showed (see FIGS. 1 and 2) that the air cells had surfaces compartmentalised into domes, most of the domes having a hexagonal (1) and some pentagonal (2) outline. Few showed a differently polygonal (3) outline. A representation showing part of a domed surface and made with the largest magnification factor is shown in FIG. 3.

The foam as prepared could be diluted 1000 times with water resulting in a white milky liquid. The same result was obtained on 1000 times dilution with a 30% by wt aqueous maltodextrin 63DE solution. Though no longer suspended/dispersed in a thick viscous aqueous liquid the gas cells with diameters less than 5–10 µm remained in suspension, although with some creaming. This creaming could be reversed by simple stirring or swirling. No significant change took place over 20 days.

Even though some flocculation of cells occurred over extended times (normally greater than several days depending on ionic concentration) the cells remained essentially stable with respect to disproportionation. Flocculation did however cause an increase in the rate of creaming of the gas cell suspension. When not flocculated the cells smaller than 10 µm can be seen to be strongly under the influence of Brownian motion, showing that the stability of these cells does not result from the cells being constrained in a rigid matrix.

The gas cells could be concentrated again to a gas phase volume of 0.4 by centrifuging the diluted liquid in a centrifuge at a speed of 2500 rpm for 5 minutes. As expected the rate of concentration of the gas cells by viscosity of the suspending phase and by the magnitude of the applied gravitational force.

The thick foam prepared by the method just described was diluted with distilled water to air phase volumes $\phi$ of 0.1; 0.01 and 0.001 respectively. After standing for 14 days gas cell sizes determinations were made both with a Coulter Counter (aperture size 70 µm) and a Malvern Zetasizer.

For the Coulter Counter determination samples of each of the three amounts of diluted foams were taken after gently shaking and these samples were diluted with distilled water to a dilution suitable for the determination.

The results were as follows:

| Phase volume $\phi$0.1 | | |
|---|---|---|
| size µm | vol % | population (000s) |
| <1.00 | 9.5 | 75 |
| 1.25 | 16.2 | 65.1 |
| 1.58 | 24.3 | 51.3 |
| 1.99 | 23.9 | 28.2 |
| 2.51 | 13.6 | 8.1 |
| 3.16 | 6.0 | 1.8 |
| 3.98 | 3.1 | 0.5 |
| 5.02 | 1.5 | 0.1 |
| 6.32 | 0.3 | 0 |
| 7.96 | 0.2 | 0 |
| 10.93 | 0.6 | 0 |
| 12.64 | 0.1 | 0 |
| 15.93 | 0 | 0 |
| TOTAL | | 230 |

| Phase volume $\phi$0.01 | | |
|---|---|---|
| size µm | vol % | population (000s) |
| <0.79 | — | — |
| 1.00 | 17.2 | 65.2 |
| 1.25 | 16.8 | 30.8 |
| 1.58 | 15.1 | 14.0 |
| 1.99 | 11.6 | 5.9 |

-continued

| Phase volume φ0.01 | | |
|---|---|---|
| size μm | vol % | population (000s) |
| 2.51 | 7.6 | 1.9 |
| 3.16 | 4.0 | 0.5 |
| 3.98 | 2.4 | 0.1 |
| 5.02 | 4.0 | 0.1 |
| 6.32 | 4.4 | 0.1 |
| 7.96 | 7.0 | 0 |
| 10.03 | 2.6 | 0 |
| | TOTAL | 119 |

| Phase volume φ0.001 | | |
|---|---|---|
| size μm | vol % | population (000s) |
| <0.79 | — | — |
| 1.00 | 22.4 | 96 |
| 1.25 | 24.5 | 52.1 |
| 1.58 | 18.8 | 20.8 |
| 1.99 | 13.0 | 7.6 |
| 2.51 | 6.4 | 1.9 |
| 3.16 | 3.1 | 0.4 |
| 3.98 | 2.2 | 0.1 |
| 5.02 | 1.5 | 0.1 |
| 6.32 | 2.2 | 0 |
| 7.96 | 1.1 | 0 |
| 10.03 | 0 | 0 |
| | TOTAL | 179 |

A blank gas cell size determination of distilled water resulted in a total background count from particulate impurities of 600.

An amount of the original foam was diluted with distilled water to an air phase volume of 0.05 and dialysed against distilled water overnight to reduce the maltodextrin in the liquid phase.

After suitable dilution the following data were obtained for gas cell size distribution using a Malvern Zetasizer.

| gas cell size class nm | relative number of gas cells % |
|---|---|
| below 353.9 | 0.0 |
| 353.9–414.6 | 0.8 |
| 414.6–490.4 | 4.7 |
| 490.4–577.2 | 10.8 |
| 577.2–679.3 | 19.1 |
| 679.3–799.6 | 27.7 |
| 799.6–941.2 | 20.2 |
| 941.2–1107.8 | 10.8 |
| 1107.8–1303.9 | 4.7 |
| 1303.9–1534.8 | 1.1 |
| over 1534.8 | 0 |

The same dialysed sample, gently sonicated in an ultrasonic cleaning bath, was subjected to a particle size determination in a Malvern Zetasizer, giving the following data:

| gas cell size class nm | relative number of gas cells % |
|---|---|
| below 241.4 | 0.0 |
| 241.4–278.1 | 1.2 |
| 278.1–320.5 | 4.5 |
| 320.5–369.3 | 8.6 |
| 369.3–425.5 | 14.5 |
| 425.5–490.3 | 20.4 |
| 490.3–564.9 | 19.2 |
| 564.9–650.9 | 15.1 |
| 650.9–750.0 | 9.8 |
| 750.0–864.2 | 5.1 |
| 864.2–995.8 | 1.6 |
| over 995.8 | 0 |

These gas cells sizes and distributions are all confirming that the major amount of gas cells is well under 10 μm size.

Example 2

An aqueous solution containing 1.5% (w/w) hydroxyethylcellulose and 6% (w/w) sucrose ester, S-1670 Ryoto Sugar Ester ex Mitsubishi Kasei Food Corporation, which is a mixture of predominantly sucrose mono and distearates was aerated in the bowl of a planetary mixer using a fine wire whisk. After 30 minutes the concentration of sucrose esters was increased by 2% by the addition of a more concentrated aqueous solution (25% w/w). Subsequent identical additions were made during whipping at 10 minute intervals until the sucrose ester concentration reached 12% w/w on the total. The overall viscosity of the aerated matrix was maintained approximately constant by the addition of an appropriate amount of water. Optionally gas cell suspensions prepared in this manner could be processed through a colloid mill to quickly remove the larger gas cells.

Two gas cell suspensions so formed were allowed to stand for 1 hour and subsequently for 1 day. After 100 fold dilutions of both samples no change could be recorded over time in the gas cell size distribution as measured by light microscopy. Observed in this was gas microcells had typical diameters in the range 1–10 μm. By light microscopy the microcells could be seen to be freely mobile both in the flowing liquid on the microscope slide and to be moving under the influence of Brownian motion. By increasing the surfactant concentration in this way an increased proportion of gas microcells relative to larger cells could be formed. After dilution to a viscosity which allowed removal of cells larger than the required size (in this case 20 μm) and separation by creaming the gas cell suspension had a phase volume of gas of ~0.4 and contained in the region of $10^9$ cells per ml. If required, excess surfactant could be removed by dialysis.

Gas microcells prepared in this way could be mixed with solutions containing a gelling or a viscosity imparting agent with appropriate yield strength properties to produce a suspension of known phase volume which is substantially stable to creaming of the cells. With suitable microbiological precautions the gas cell suspension remained unchanged over a period of many weeks.

Example 3

Figure 4:
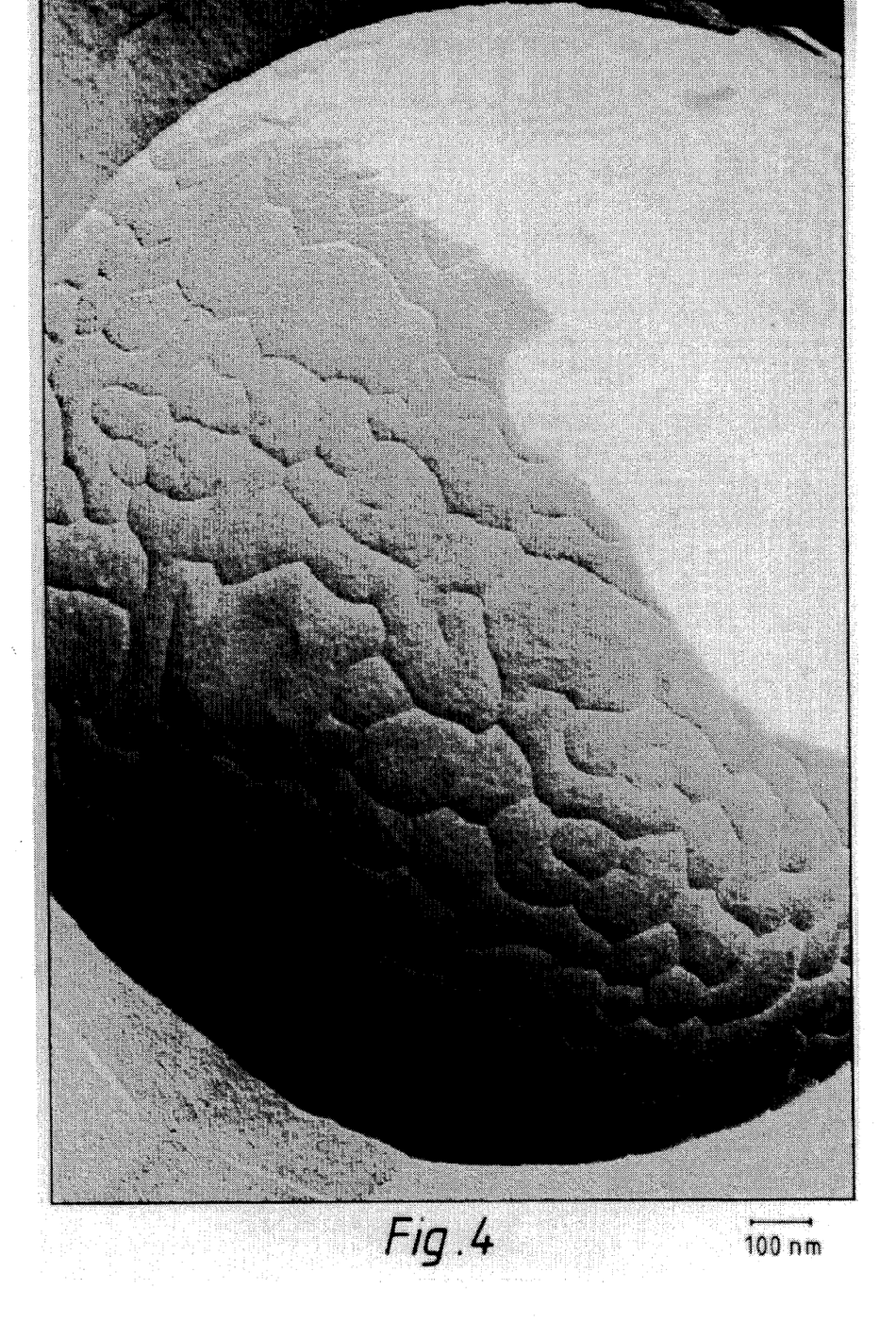

Gas microcells have been prepared using a mixture of two types of surfactants having different head group sizes but the same or very similar saturated hydrophobic chains. This example illustrates that microcells of substantial stability can be prepared by the addition of various amounts of co-surfactant(s) in which the characteristic surface dome features can be expanded such that the radius of the dome is modified to become more (or less) similar to that of the gas cell surface. This can be illustrated by transmission electron micrograph (FIG. 4). The sample was prepared by the procedure of Example 1 but from a composition of surfactants of sucrose ester (1.3 w/v) and stearic acid (0.07% w/v). In such microcells the regular pattern is disturbed. Whilst the cell surface remains curved and separated into domains these are no longer regular. An otherwise identical preparation but this time containing 1.3% w/v sucrose ester and 0.7% stearic acid produced gas microcells containing essentially smooth surfaces with only a few lines or discontinuities separating the curved surfaces. Many cells showed no separate regions. After ageing for 13 days and separation of the microcells by 10 times dilution and removal of the larger cells by creaming, the microcells, in two separate determinations of size distribution gave a $d,32$ of 1.19 and 1.25 μm for the dispersion. Microcells in these examples showed stability characteristics analogous to those microcells described above.

Example 4

Figure 5:
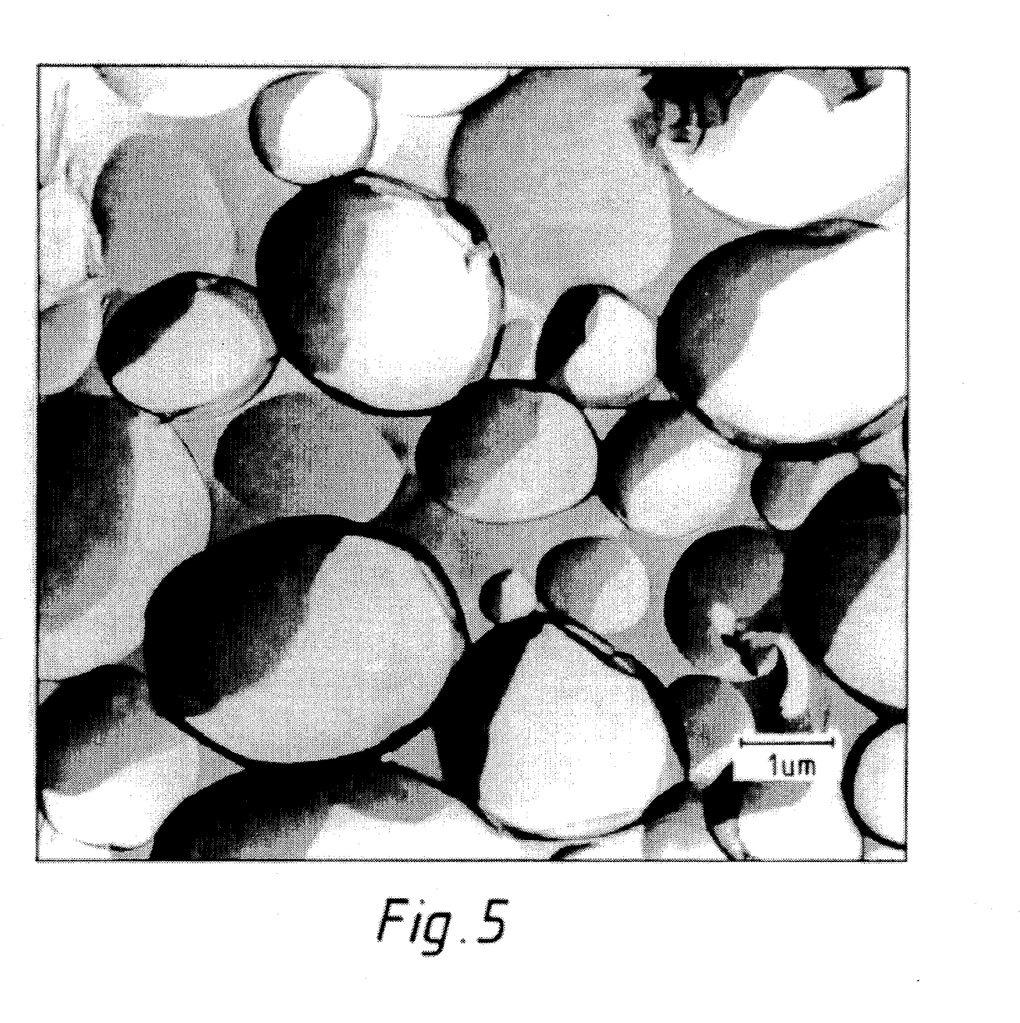
Figure 6:
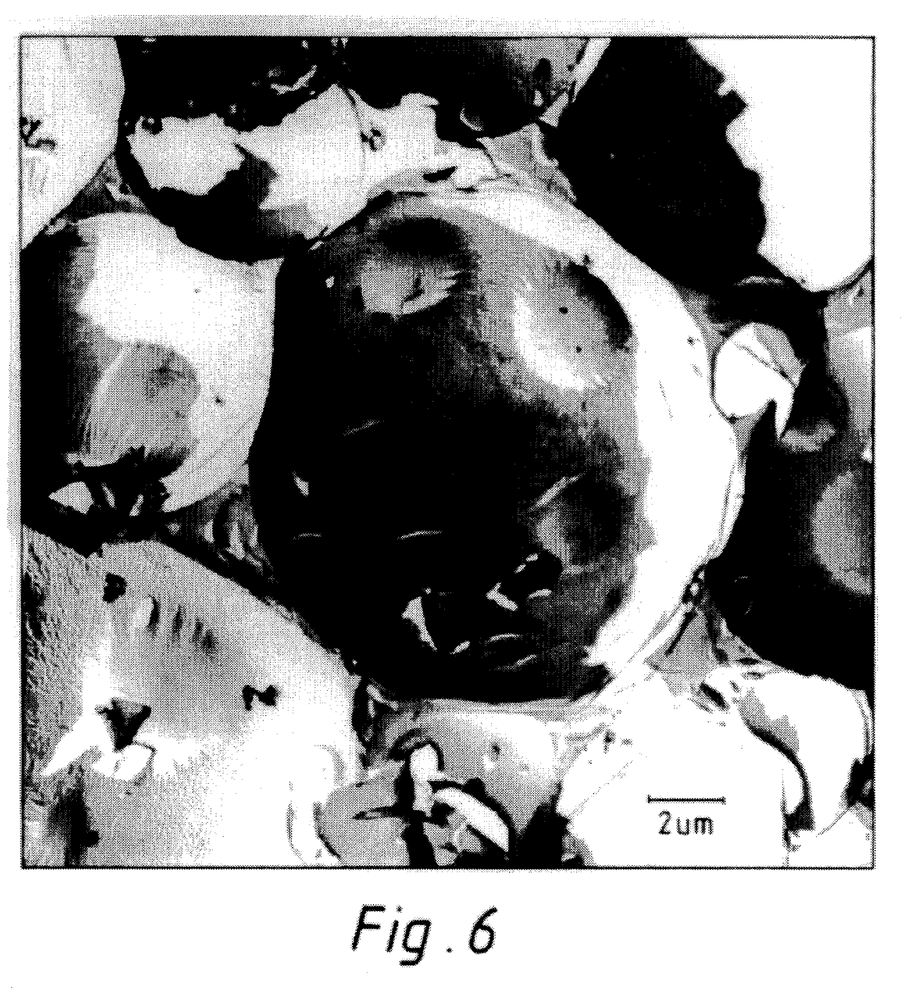

Defatted and fully hydrogenated phosphatidylcholine (PC) (98% pure and containing 1% lysophosphatidylcholine plus other phospholipids as impurities (Emulmetic 950 ex Lucas Meyer)) was used in a small scale preparation of gas microcells. 0.5 g PC was heated to 65° C. in 10 g of 60% maltodextrin solution. A homogenous dispersion was prepared by stirring whilst controlling the temperature for 1 hour. Further dispersion using an ultrasonic probe was used in a second run with similar results. The suspension was aerated at room temperature for 1 hour using a microscale whipping apparatus comprising a cage of stainless steel wires driven by a variable speed motor. A phase volume of typically 0.7 was obtained in the initial aeration step. After ageing for 24 hours the foam comprising microcells could be stripped of the larger cells by creaming. The microcells when viewed by transmission electron microscopy had surfaces characterised by the presence of waves or wrinkles (FIG. 6) and frequently deviated substantially from an overall spherical (FIG. 5). Cells in the range 1–20 μm could be harvested by standard separation techniques.

Example 5 illustrate ice confections in accordance with the invention which contain preformed gas cells and, for purposes of comparison, similar products in which the gas cell ingredients have been added but without formation of structured gas cells.

Example 5

Gas cells (GC) prepared in accordance with the method described in Example 1 and, for the purposes of comparison, separate ingredients from which gas cells are manufactured (GCI), were incorporated at 15% by weight into a milk ice lolly (product A) and a low fat ice cream (product B).

GC Production

Three batches, 1400 g each, were made by whipping premixes 1 and 2 together for 60 mins using a Hobart mixer (Model AE200) at maximum speed. Two batches of approx 1800 g each were then made from the original three by mixing and dividing. The GCs were stored at 4° C. for 3 days. The GC samples had a phase volume of 0.68 and this was reduced by stirring with a spatula. After mixing by hand for about 10 mins on both day 3 and day 4 the phase volume was reduced to 0.59. Both batches were combined and then redivided to give the same material in each batch.

| Ingredients: | weight (g) | % |
| --- | --- | --- |
| Premix 1 | | |
| Sucrose | 910 | 72.8 |
| Water | 340 | 27.2 |
| Total | 1250 | 100.0 |
| Premix 2 | | |
| Sucrose mono-ester S1670* | 28 | 18.6 |
| Water | 122 | 81.3 |
| Total | 150 | 100.0 |

*obtainable from Mitsubishi Corp (UK) Ltd of London England

GCs - Theoretical analysis

| | % inclusion (weight basis) |
| --- | --- |
| Sucrose | 65 |
| Sugar ester S1670 | 2 |
| Water | 33 |

Gas Cell Ingredients production: The ingredients used in the preparation of gas cells were mixed but not whipped.

Ice Cream/Ice Lolly Production

The dry ingredients used for the main mixture were added to cold water (24° C.) and mixed for 10 minutes before adding the egg yolk (milk ice lolly only). The mixture was then blended and heated until the temperature reached 60° C. when the butteroil was added. The mixture was then further heated until the temperature reached 65° C. when it was then homogenised at 2000 psi before pasteurising at 82° C. The two mixes were held in the ageing vessels for two hours at approximately 8° C. before transferring to a Crepaco C250 ice cream freezer. The mixtures were then extruded from the freezer, weighed, transferred to the −10° C. cold room and the gas cells or gas cell ingredients (15%) stirred in by hand. The final mixtures were transferred to plastic sample pots (80 ml capacity) by hand and then placed in a blast freezer overnight.

| | Weight (g) | % inclusion in final mix (by weight) |
| --- | --- | --- |
| Milk Ice Lolly recipe (product A) | | |
| Sucrose | 2.375 | 4.75 |
| Water | 33.156 | 66.312 |
| Egg Yolk + 40% Sucrose | 0.387 | 0.774 |
| Butteroil | 2.177 | 4.354 |
| Locust Bean Gum | 0.155 | 0.31 |
| Skimmed Milk Powder | 4.250 | 8.50 |
| GC or GCI | 7.500 | 15.000 |
| Low fat ice cream recipe (product B) | | |
| Water | 28.665 | 57.33 |
| Butteroil | 1.500 | 3.00 |
| Locust Bean Gum | 0.055 | 0.11 |

|  | Weight (g) | % inclusion in final mix (by weight) |
| --- | --- | --- |
| Skimmed Milk Powder | 5.000 | 10.00 |
| Maltodextrin (17-19DE) | 4.000 | 8.00 |
| Glycerol Mono Stearate (GMS) | 0.250 | 0.50 |
| Guar Gum AV/225 | 0.030 | 0.06 |
| Maltodextrin (40DE) | 3.000 | 6.00 |
| GC or GCI | 7.500 | 15.00 |

The ice cream/lolly products were stored at −20° C. until required for taste panelling.

A tasting panel compared the products containing GC with those containing only the ingredients. The presence of the GCS improved product A by giving a more creamy/less icy mouth feel together with a softer feel and warmer eating. Product B containing GC was softer and sweeter with a vanilla flavour being enhanced. Both products had a whiter appearance.

We claim:

1. An ice confection comprising gas cells having a stability in excess of 2 weeks and having a $d_{32}$ average particle size of less than 20 μm.

2. An ice confection according to claim 1, wherein the $d_{32}$ average particle size of the gas cells is from 0.1 to 10 μm, more preferably 0.5 to 3 μm.

3. An ice confection according to claim 1, wherein the gas cells have a surface comprising edible surface active materials.

4. A method of preparing an ice confection according to claim 1 wherein the gas cells are prepared in bulk separately and added as an ingredient to the ice confection during or after its preparation.

* * * * *